United States Patent
Hori (10) Patent No.: US 9,274,728 B2
(45) Date of Patent: Mar. 1, 2016

(54) PRINT CONTROL APPARATUS AND PRINT CONTROL METHOD

(71) Applicant: CANON KABUSHIKI KAISHA, Tokyo (JP)

(72) Inventor: Daisuke Hori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/600,333

(22) Filed: Jan. 20, 2015

(65) Prior Publication Data

US 2015/0212771 A1     Jul. 30, 2015

(30) Foreign Application Priority Data

Jan. 24, 2014  (JP) .................................. 2014-011395

(51) Int. Cl.
```
G06F 3/12      (2006.01)
G06K 15/00     (2006.01)
G06K 15/02     (2006.01)
```
(52) U.S. Cl.
CPC ............ *G06F 3/1241* (2013.01); *G06F 3/1242* (2013.01); *G06F 3/1251* (2013.01); *G06K 15/005* (2013.01); *G06K 15/022* (2013.01)

(58) Field of Classification Search
USPC ................. 358/1.18, 1.5, 1.4, 451, 1.8, 1.12
See application file for complete search history.

(56) References Cited

U.S. PATENT DOCUMENTS

| | | | |
|---|---|---|---|
| 2005/0200861 A1* | 9/2005 | Kubota | 358/1.5 |
| 2006/0039015 A1* | 2/2006 | Kageyama et al. | 358/1.5 |
| 2009/0103119 A1* | 4/2009 | Okuzawa et al. | 358/1.9 |
| 2012/0236363 A1* | 9/2012 | Nagaoka et al. | 358/1.15 |
| 2013/0286139 A1* | 10/2013 | Furuki et al. | 347/217 |
| 2014/0002525 A1* | 1/2014 | Takeishi | 347/14 |
| 2014/0036315 A1* | 2/2014 | Fukuda | 358/1.18 |
| 2014/0043387 A1* | 2/2014 | Maeda | 347/16 |
| 2015/0139673 A1* | 5/2015 | Devlieghere et al. | 399/49 |

FOREIGN PATENT DOCUMENTS

JP      2003-191538 A     7/2003

* cited by examiner

*Primary Examiner* — Jerome Grant, II
(74) *Attorney, Agent, or Firm* — Fitzpatrick, Cella, Harper & Scinto (57) ABSTRACT

There is provided a print control apparatus capable of outputting a plurality of printed materials after a user checks a dividing line of an original image and the layout of image portions on each page when performing poster printing. For this purpose, the original image is divided based on the size of the original image and the size of a sheet such that each of a plurality of image portions obtained by division sets in the predetermined size. At the same time, the original image is displayed in print preview, so that the dividing line of the original image is specified. This allows the user to output printed materials and obtain a product after checking the dividing line of the image.

20 Claims, 9 Drawing Sheets

PRINT CONTROL APPARATUS AND PRINT CONTROL METHOD

BACKGROUND OF THE INVENTION

1. Field of the Invention

The present invention relates to a print control apparatus and a print control method.

2. Description of the Related Art

In poster printing, an image is enlarged to a predetermined size and then divided into a plurality of image portions. The image portions are individually printed on a plurality of sheets of a size that can be handled by a printer. Then, a user joins the output sheets together, whereby a product having a large size is completed. Japanese Patent Laid-Open No. 2003-191538 discloses a print control method performed by a printing apparatus that handles roll paper, in which an image is divided into strips and printed so that the number of segments of the image is reduced and the work of pasting is minimized as possible.

Unfortunately, in the technique disclosed in Japanese Patent Laid-Open No. 2003-191538, the user only specifies a finish size after the pasting and the number of segments, and other processing such as enlargement processing and dividing processing is automatically performed by a printer driver. Therefore, it is difficult for the user to check, before printing, along what line an original is divided into image portions and where and in what size margins are provided in each output material. For example, even if each page can be displayed by using a print preview function in the printer driver, it is sometimes difficult to know in advance, for example, how a margin is provided between the image portions in printing.

SUMMARY OF THE INVENTION

The present invention was made to solve the above-described problems. Accordingly, an object of the present invention is to provide a print control apparatus and a print control method capable of outputting a plurality of printed materials after a user checks a dividing line of an image to be printed and the layout of image portions on each page.

In a first aspect of the present invention, there is provided a print control apparatus for causing a printing apparatus to print on continuous paper each of a plurality of image portions obtained by dividing an image to be printed, the print control apparatus comprising: a determination unit configured to determine a dividing line of the image to be printed such that a short-side direction of the image to be printed is divided by a length corresponding to a width direction of the continuous paper; a display control unit configured to cause a display device to display the image to be printed so as to indicate the dividing line of the image to be printed determined by the determination unit; and a print control unit configured to cause the printing apparatus to print on the continuous paper the plurality of image portions obtained by dividing the image to be printed along the dividing line based on the dividing line displayed by the display control unit.

In a second aspect of the present invention, there is provided a print control method for causing a printing apparatus to print on continuous paper each of a plurality of image portions obtained by dividing an image to be printed, the print control method comprising: a determination step of determining a dividing line of the image to be printed such that a short-side direction of the image to be printed is divided by a length corresponding to a width direction of the continuous paper; a display control step of causing a display device to display the image to be printed so as to indicate the dividing line of the image to be printed determined in the determination step; and a print control step of causing the printing apparatus to print on the continuous paper the plurality of image portions obtained by dividing the image to be printed along the dividing line based on the dividing line displayed in the display control step.

In a third aspect of the present invention, there is provided a non-transitory computer readable storage medium storing a program for causing a computer to perform the print control method recited above.

Further features of the present invention will become apparent from the following description of exemplary embodiments (with reference to the attached drawings).

DESCRIPTION OF THE EMBODIMENTS

An embodiment of the present invention will now be described with reference to the attached drawings.

First Embodiment

Figure 1:
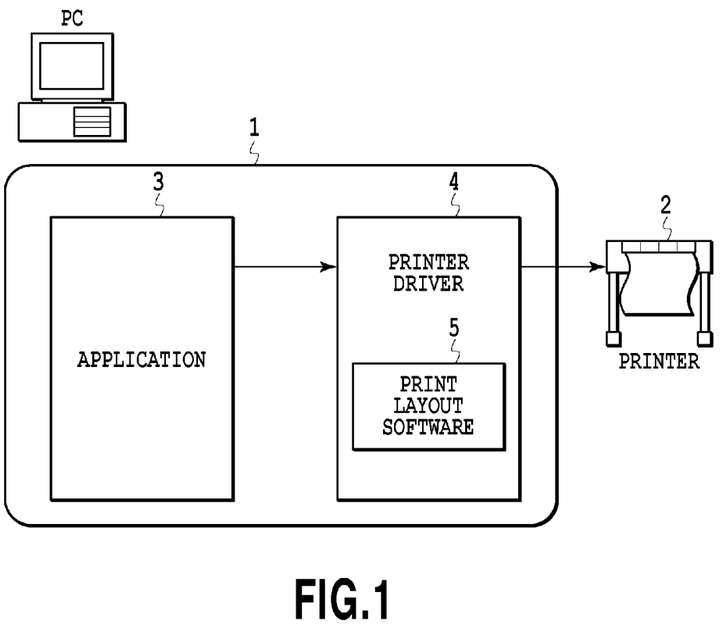
FIG. 1 is a block diagram showing a printing system that can be used in the present invention.

FIG. 1 is a block diagram showing a printing system that can be used in the present invention. In the present embodiment, the printing system includes a host device 1 such as a personal computer and a printer 2. The host device 1 and the printer 2 are connected with each other via a predetermined bi-directional interface such as a USB, an IEEE 1394, or a TCP/IP.

The host device 1 is provided with software such as an application 3 for a user to create an original image and a printer driver 4 for processing image data on the original image created in the application 3 to printable print data for the printer 2. A print layout software 5 performs characterized processing of the present invention when poster printing is specified, and serves as one of the functions of the printer driver 4.

Figure 2:
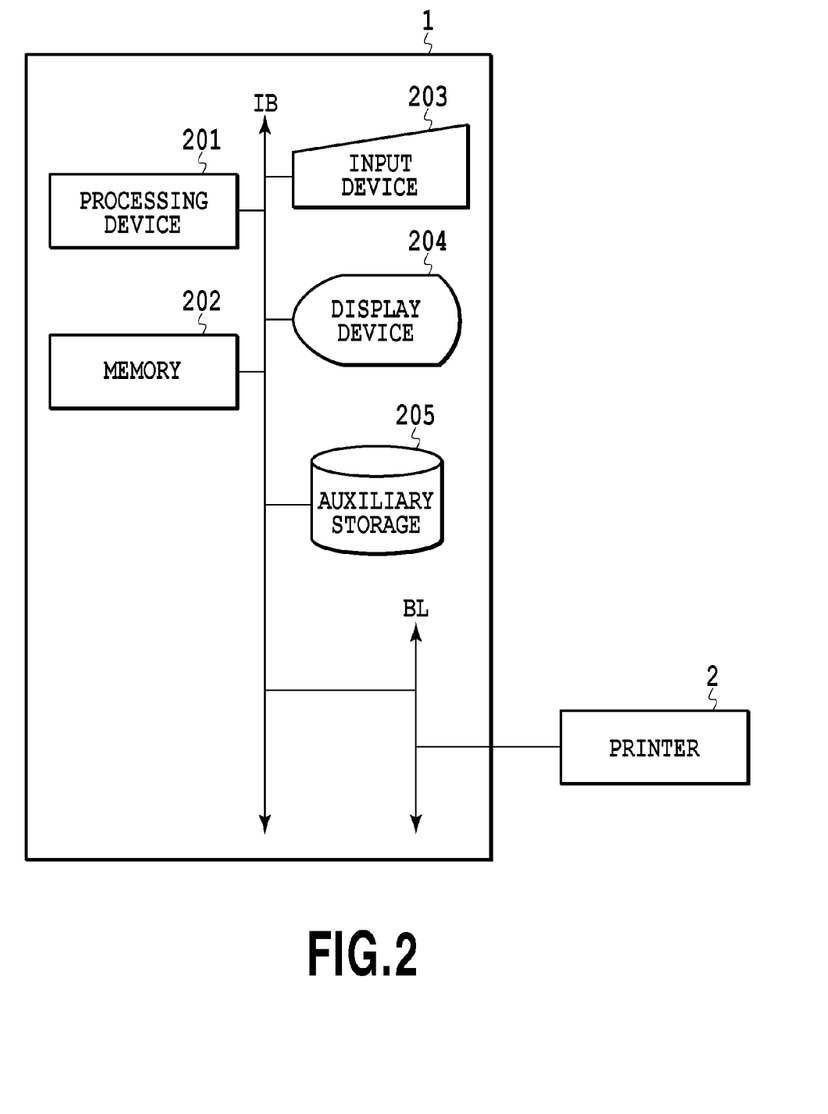
FIG. 2 is a block diagram showing a hardware configuration of the printing system.

FIG. 2 is a block diagram showing a hardware configuration of the printing system. The host device 1 includes a processing device 201 having a CPU, a memory 202 such as a RAM, an input device 203 such as a mouse or a key board, a display device 204 such as a CRT or an LCD, and an auxiliary storage 205 such as a hard disk or a magneto-optical disk. These devices are connected via an internal bus line IB. Incidentally, the input device 203 and the display device 204 may be external devices connected to the host device 1. The processing device 201 controls the processing of the entire system using the memory 202 as a working area according to various programs stored in the auxiliary storage 205. The auxiliary storage 205, for example, stores therein the application 3, the printer driver 4, an OS, and other program information, and is appropriately invoked by the processing device 201 and loaded on the memory 202. The processing device 201 provides various kinds of information for a user via the display device 204 and receives various commands and settings entered by the user through the input device 203. The internal bus line IB is connected to the printer 2 via an external bus line BL, so that the host device 1 can register a job for the printer 2. The processes illustrated in the flow charts of FIGS. 5 and 7 to 9 are executed also by the processing device 201.

Figure 3:
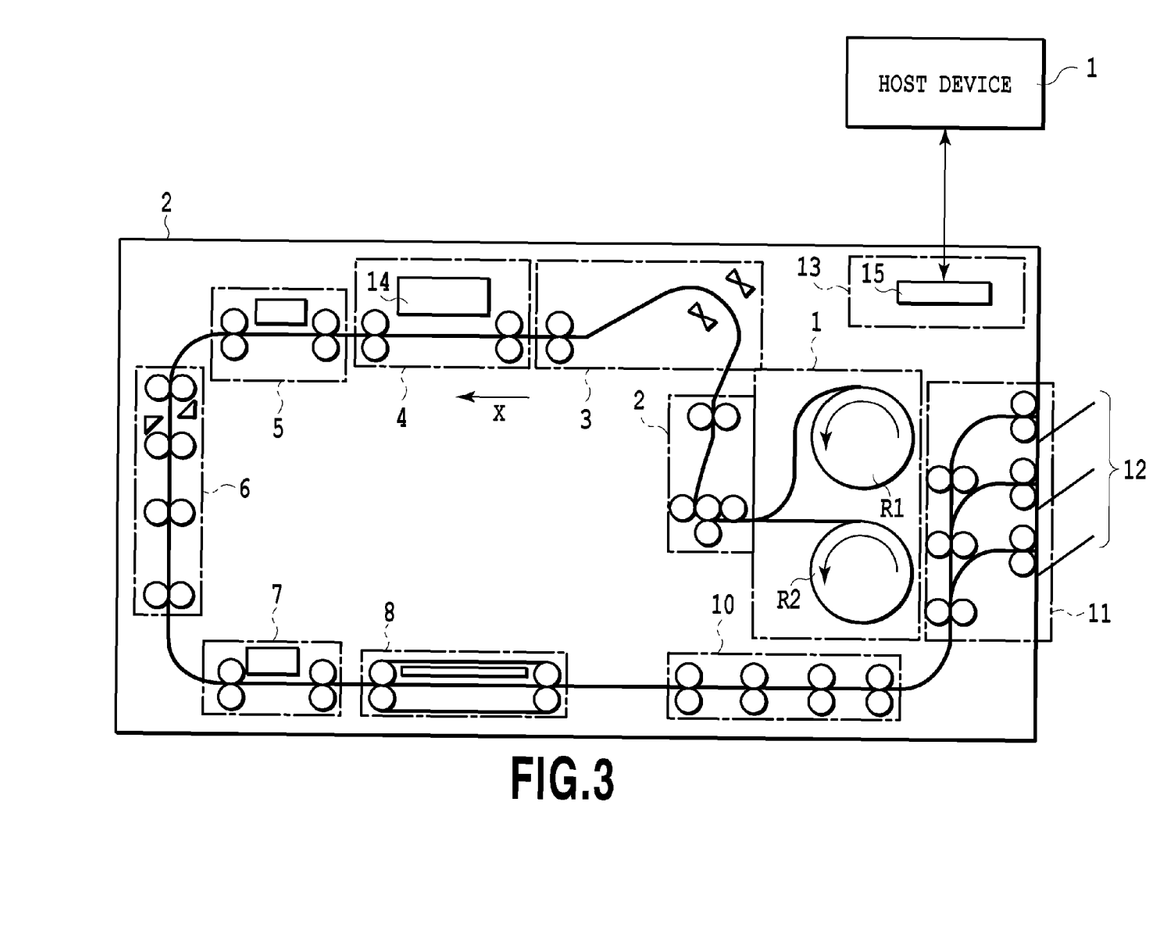
FIG. 3 is a cross-sectional view illustrating an internal configuration of a printer that can be used in the present invention.

FIG. 3 is a cross-sectional view illustrating an internal configuration of the printer 2 that can be used in the present invention. In FIG. 3, a control unit 13 includes, for example, a controller 15 having control over the printer 2. A sheet supply unit 1 accommodates two rolls of paper R1 and R2, alternatively draws a sheet (paper), and supplies the sheet to a conveying path. Other than the roll paper, the sheet supply unit 1 can also supply a cut sheet from a paper feed tray (not shown).

A decurling unit 2 is a unit that reduces a curl (warpage) of the sheet supplied from the sheet supply unit 1. In the decurling unit 2, two pinch rollers are pressed against one drive roller so as to apply warpage to the sheet in a direction opposite to the curl. Passing the sheet through the decurling unit 2 reduces the curling of the sheet in the sheet supply unit 1, and accordingly the sheet is smoothly conveyed.

A skew correction unit 3 is a unit that corrects a skew (inclination with respect to an advancing direction) of the sheet which has passed through the decurling unit 2. A sheet end portion on a side serving as a reference is pressed against a guide member, whereby the sheet is directed so as to proceed straight ahead.

A printing unit 4 prints an image on the conveyed sheet with ink ejected from a print head portion 14. In the print head portion 14 of the present embodiment, a plurality of print heads provided for ink colors are arranged in parallel in an X direction. In the present example, the print head portion 14 has four print heads corresponding to four colors of C (Cyan), M (Magenta), Y (Yellow), and K (Black). The number of colors and the number of print heads are not limited to four. Furthermore, a print head other than an ink jet print head may be used.

A cutter unit 6 is a unit that cuts for each page the image of the printed portion if the sheet is roll paper. An information recording unit 7 records, on a margin area of the image sheet, information such as a serial number and a date related to the printed image using letters or codes. A drying unit 8 is a unit that dries applied ink in a short period of time.

A discharge/conveying unit 10 conveys sheets cut by the cutter unit 6 and dried by the drying unit 8 to a sorting unit 11. The sorting unit 11 sorts the printed cut sheets into groups by sizes or the like and discharges them into individual discharge ports. Each discharge port has a tray 12 for receiving the cut sheets. The cut sheets are placed on one of the trays 12.

The processing of poster printing by using the above-described printing system will be described in detail. To perform poster printing on an original image created in the application 3, the user selects and activates a print dialog from a menu on the application 3. If a property button or the like is pressed in the print dialog on the application 3, a UI screen of the currently set printer driver 4 is displayed. The user can check or change the print settings on this screen.

Figure 4:
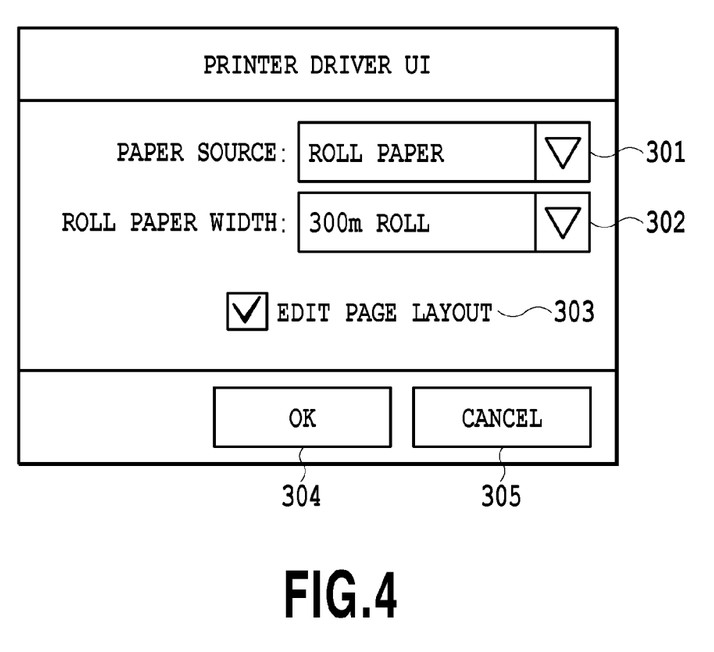
FIG. 4 shows an exemplary UI window when poster printing is performed.

FIG. 4 shows an exemplary UI window provided by the printer driver 4 when poster printing is performed. In FIG. 4, a paper source combo box 301 is a combo box for a user to specify a paper source of an output sheet. In the present embodiment, the user can select from roll paper and cut paper.

If roll paper is specified in the paper source combo box 301, a roll paper width combo box 302 is activated and the user can set a size from a plurality of roll paper widths (sizes).

A page layout edit check box 303 is a check box for a user to set whether to check/adjust the layout of image portions. If the page layout edit check box 303 is marked, the user can check and adjust the layout of image portions through the print layout software 5 when the print layout software 5 is activated. The operation of the print layout software 5 will be described later. If an OK button 304 is clicked after the above settings are made, the setting of the printer driver 4 is completed. Meanwhile, if a cancel button 305 is clicked, all the items set in FIG. 4 are cancelled.

Then, by clicking a print start button in the print dialog of the application 3, print data is sent from the application 3 to the printer driver 4, and the layout processing is started via the print layout software 5.

Figure 5:
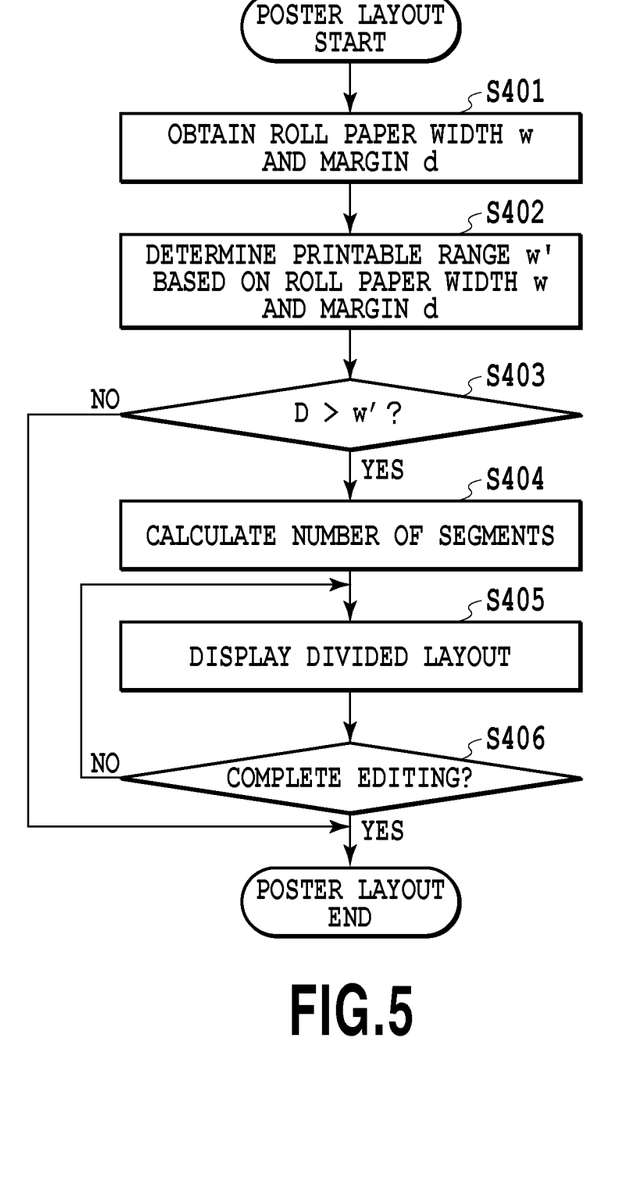
FIG. 5 is a flow chart illustrating layout processing.

FIG. 5 is a flow chart illustrating layout processing performed by the print layout software 5. Once the present processing starts, first in step S401, the print layout software 5 obtains a width W of the roll paper and a margin d set in the window of FIG. 4 from the printer 2 or the printer driver 4.

In the following step S402, based on the width W of the roll paper and the margin d obtained in step S401, a printable range in a width direction of the roll paper $W'=W-2\times d$ is calculated. For example, in a case where the width of the roll paper is W=300 mm and the margin is d=5 mm, a printable range W' (290 mm) is obtained by subtracting 5 mm (right) and 5 mm (left) from the width of the roll paper 300 mm.

In step S403, it is determined whether a width D of the original image exceeds the printable range W'. If D>W', it is determined that poster printing processing is needed, and the process proceeds to step S404. Meanwhile, if the determination in step S403 is D≤W', the original image is determined to be printable on the roll paper without being divided, and the present processing is completed.

In step S404, based on the width D of the original image and the printable range W', a number of segments N is calculated such that each of the image portions obtained by division sets in a sheet size. More specifically, a number of segments N is set to the smallest natural number which satisfies D/N≤W'. For example, in the case of the width of the roll paper W=300 mm, the margin d=5 mm, and the width of the original image D=600 mm, the number of segments is N=3 (600/3<290). In looking at each of three image portions obtained by division, for example, the left image has a margin d=5 mm at the left side and a margin d=5 mm at the right side, and a remaining width of 290 mm (=300−2×5) forms an image print area. The middle image also has a margin d=5 mm at the left side and a margin d=5 mm at the right side, and a remaining width of 290 mm (=300−2×5) forms an image print area. The right image has a margin d=5 mm at the left side and a remaining width of 20 mm (=600−(290+290)) of the original image width D forms a print image area. As a result, a margin of 275 mm (=300−(5+20)) is formed at the right side.

In step S405, the layout of image portions of the original image is displayed via the display device 204 based on the above conditions W, d, W', D, and N. Note that in this display, the print layout software 5 obtains data (image, text, or the like) to be printed from the application 3, and controls the display based on the obtained data.

Figure 6A:
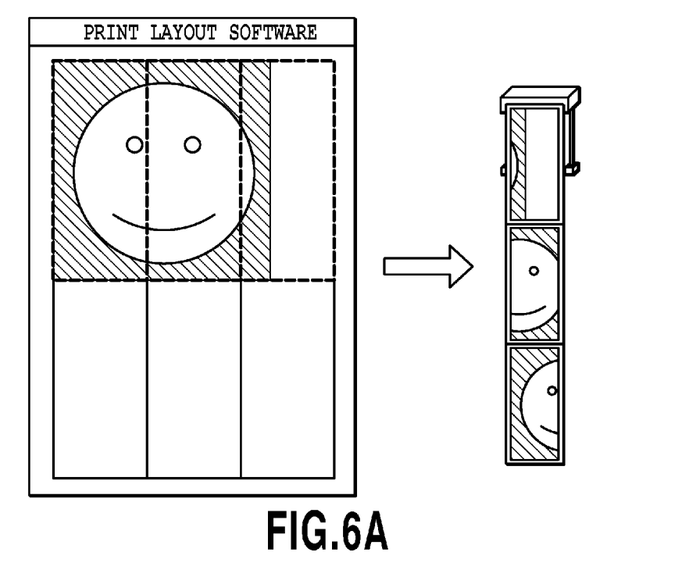
FIGS. 6A to 6C show an exemplary layout to be displayed.
Figure 6B:
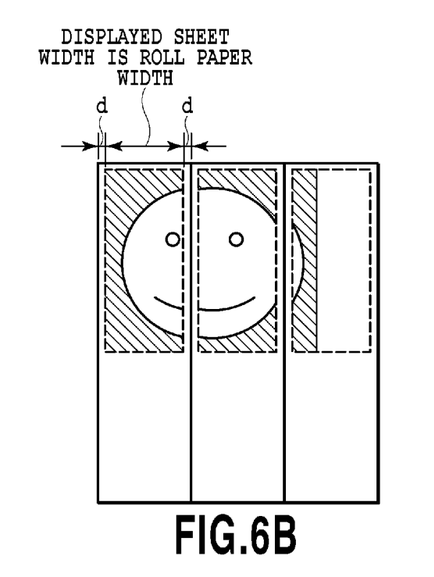
Figure 6C:
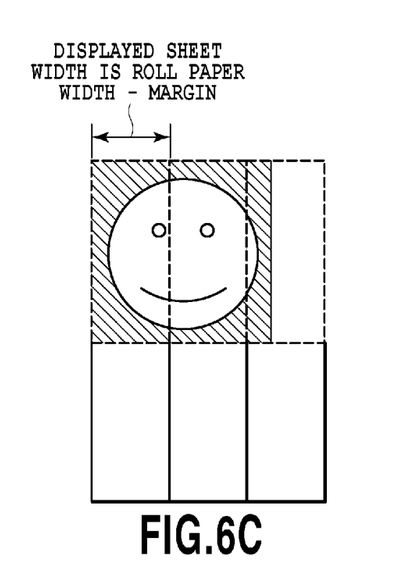

FIGS. 6A to 6C show an exemplary layout to be displayed in step S405 after division. From this display, the user can know that the original image is divided into three, the dividing lines of the image, and the layout of the image portions in each output sheet. At the same time, it is possible to switch, for example, between displaying margins as shown in FIG. 6B and hiding margins as shown in FIG. 6C. Broken lines define the print areas of the image portions, that is, the dividing lines of the original image. Switching the display allows the user to check both of how an output material from the printer looks and how a product after pasting looks.

Furthermore, the user can also reedit the layout of the image portions via the input device 203 while checking the layout image. For example, in the states shown in FIGS. 6A to 6C, in a case where a dividing line that divides a face image on an eye is not preferable, the user can move the initial image to a preferable position by an action such as dragging which moves the initial image to the right while clicking with a cursor. In addition, in the states shown in FIGS. 6A to 6C, the action such as dragging allows the user to scale the image. More specifically, the print layout software 5 performs editing on the image based on the data to be printed. Incidentally, in a case where the data to be printed is text data or vector data, editing can be performed on the data before being rendered to a bitmap image. This can prevent the degradation of the image caused by enlargement of the bit map image even if the user performs enlargement of the image.

After the user completes the layout and enters an edit end command in step S406, the present processing is completed.

Figure 7:
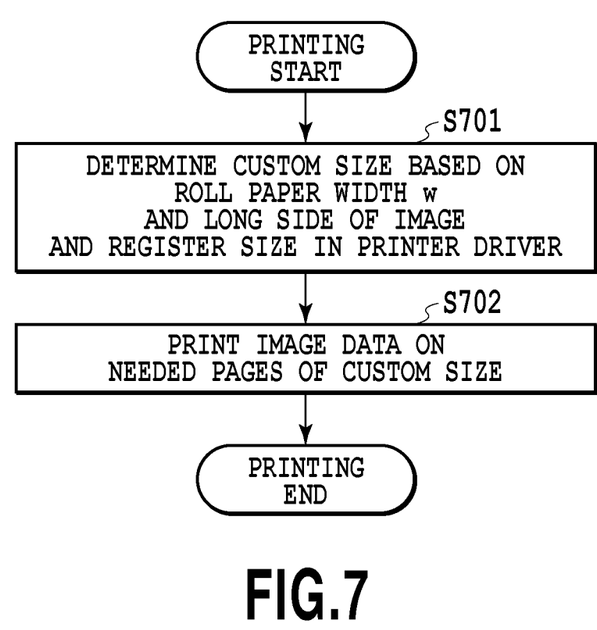
FIG. 7 is a flow chart illustrating printing processing.

FIG. 7 is a flow chart illustrating printing processing performed by the printer driver 4 in a case where a user enters a print start command after the print layout processing described with reference to FIG. 5. Once the present processing starts, the printer driver 4, first in step S701, determines the width and the height of the output sheet from the width W of the roll paper and the long side of the image portion (length of the image in a conveying direction). Then, the height of the output sheet is set to the long side of the finish size and registered as a custom size that is actually used for printing by the printer 2.

In the following step S702, based on the result of the print layout described with reference to FIG. 5, a plurality of output sheets of the custom size set in step S701 are outputted. More specifically, the printer driver 4 obtains the data to be printed (data after editing in a case where some edits such as moving or scaling of the image are made) obtained by the print layout software 5 and creates an image for printing. Then, the printer driver 4 divides the image along the dividing lines determined by the print layout software 5, and layouts the image portions obtained by the division on the pages of the size registered in step S701. Then, the printer driver 4 outputs the laid out image portions to the printer 2.

Referring to FIG. 3, after the output sheet held in a roll is supplied to a conveying path, three images that are laid out as shown in FIGS. 6A to 6C are sequentially printed in the printing unit 4. Then, after the output sheet is cut by the cutter unit 6 into printed materials having a length corresponding to the long side of the custom size, the printed materials are discharged to the tray 12. The present processing is completed.

After that, the user uses the margin area d for pasting areas, and bonds the three output printed materials together. Accordingly, a product obtained by division and bonding at the positions desired by the user can be obtained.

Second Embodiment

In the above embodiment, a description has been given of the case where the margin area d is used for bonding areas in performing standard printing. However, it is also possible to prepare more areas for bonding.

Figure 8:
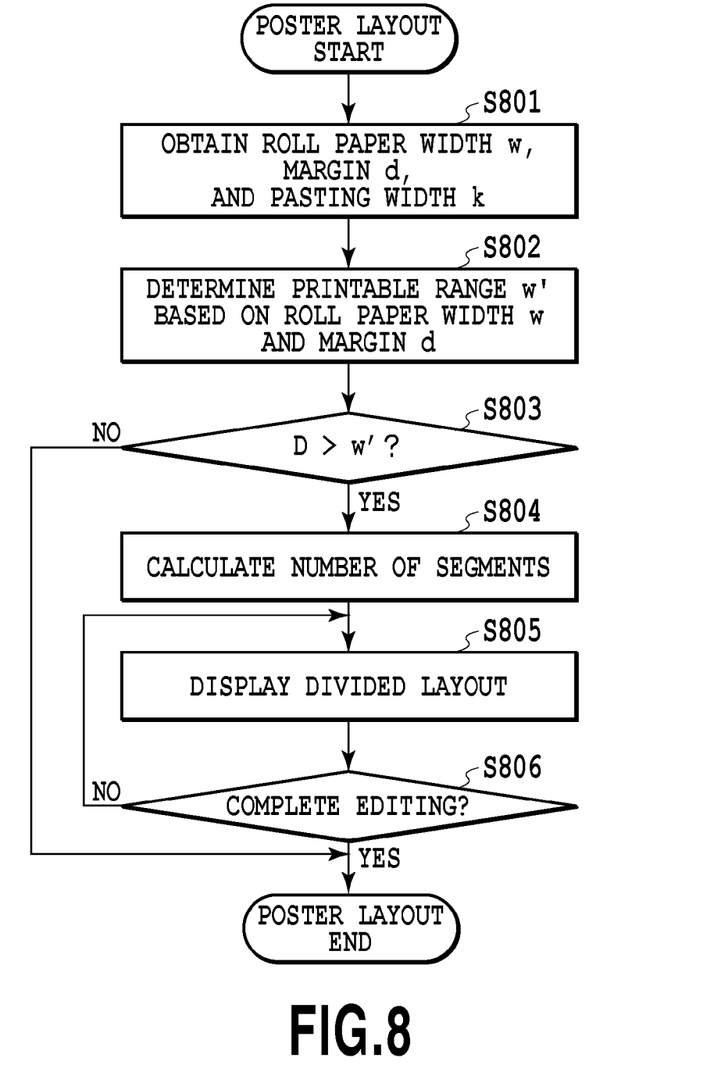
FIG. 8 is a flow chart illustrating layout processing.

FIG. 8 is a flow chart illustrating layout processing performed by a print layout software 5 in the present embodiment. Once the present processing starts, the print layout software 5, in step S801, obtains a width W of roll paper and a margin d as well as a tab (pasting area) k from a printer 2 or a printer driver 4. On this occasion, a user may set any width of the tab k via the printer driver 4.

In the following step S802, the print layout software 5 calculates a printable range W' in a width direction of the roll paper based on the width W of the roll paper and the margin d obtained in step S801.

In step S803, the print layout software 5 determines whether a width D of an original image exceeds the printable range W'. If D>W', it is determined that poster printing processing is needed, and the process proceeds to step S804. Meanwhile, if the determination in step S803 is D≤W', the original image is determined to be printable on the roll paper without being divided, and the present processing is completed.

In step S804, the print layout software 5 calculates a number of segments N of the original image based on the width D of the original image, the width W of the roll paper, the margin d, and the width of the pasting area k obtained in step S801. On this occasion, in the present embodiment, not the margin d but the pasting area k which is larger than the margin d is prepared as a margin at a connecting portion in the original image. Then, margins d are prepared at both ends of the original image. For example, in the case of the width of the roll paper W=300 mm, the margin d=5 mm, the width of the pasting area k=30 mm, and the width of the original image D=600 mm, the number of segments is N=3. In looking at each of three image portions obtained by division, for example, the left image has a margin d=5 mm at the left side and a margin k=30 mm at the right side, and a remaining width of 265 mm (=300−35) forms an image print area. The middle image also has a margin d=5 mm at the left side and a margin k=30 mm at the right side, and a remaining width of 265 mm (=300−35) forms an image print area. The right image has a margin d=5 mm at the left side and a remaining width of 70 mm (=600−(265+265)) of the original image width D forms a print image area. As a result, a margin of 225 mm (=300−(5+70)) is formed at the right side. Since a margin which is larger than the margin d is prepared as a width of a pasting area k, the entire image extends to the right and a right margin of the right image is smaller as compared to the first embodiment. Note that in the above example, the number of segments N=3 is the same as that in the first embodiment, but the number of segments N may be larger than that in the first embodiment depending on a value of k.

In step S805, the print layout software 5 displays the layout of image portions of the original image via the display device 204 based on the above conditions W, d, k, W', D, and N, and accepts a change in the layout of the original made by a user. On this occasion, in the present embodiment, since four margins corresponding to dividing lines have a width k, not a width d which is smaller than the width k, the right end of the enlarged image moves to the right position further than that shown in FIG. 6B. Then, the user can lay out the initial image to a preferable position via the input device 203 while checking the layout image. After that, the user enters an edit end command in step S806, and the present processing is completed.

Figure 9:
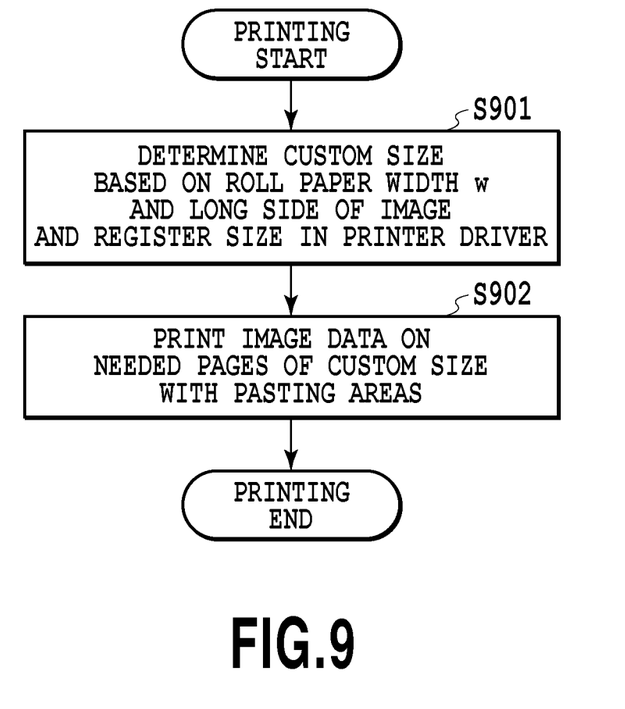
FIG. 9 is a flow chart illustrating printing processing.

FIG. 9 is a flow chart illustrating printing processing performed by the printer driver 4 in a case where the user enters a print start command after the print layout processing described with reference to FIG. 8. Once the present processing starts, the printer driver 4, first in step S901, determines the width and the height of the output sheet from the width W of the roll paper and the long side of the image portion. Then, the printer driver 4 sets the height of the output sheet to the long side of the finish size and registers it as a custom size that is actually used for printing by the printer 2.

In the following step S902, the printer driver 4 outputs a plurality of output sheets of the custom size set in step S901, based on the result of the print layout described with reference to FIG. 8. More specifically, referring to FIG. 3, after the output sheet held in a roll is supplied to a conveying path, prints three images that are laid out in preferable positions sequentially in a printing unit 4. Then, after the area printed as the layout is cut by a cutter unit 6 into printed materials having a length corresponding to the long side of the custom size, the printed materials are discharged to a tray 12. The present processing is completed.

After that, the user bonds the three output printed materials together over pasting areas k. Accordingly, a product obtained by division and bonding at the positions desired by the user can be obtained.

As described above, according to the present invention, in poster printing, a user can obtain a product obtained by division and bonding at the positions desired by the user.

A description has been given of the example in the case of printing on roll paper that is continuous paper. However, the feature of the present invention that a user lays out an original image while checking a print preview screen as shown in FIGS. 6A to 6C effectively functions also in the case of using cut paper. In the case of using cut paper, the output sheet in a conveying direction is also limited, and thus it is assumed that the original image may be divided not only in a width direction (shot-side direction) but also in a conveying direction (long-side direction) of paper. The scope of the present invention includes such a case as long as the user can lay out the original image to a preferable position while checking a plurality of divided laid out images.

In the above, as shown in FIG. 1, the printing system including a host device 1 having a printer driver installed thereon and a printer 2 has been described as a print control apparatus of the present invention. However, the print control apparatus of the present invention may have any other configuration. For example, the printer 2 itself may perform the entire process shown in FIG. 6, which has been described as the process performed by the printer driver. In this case, the printer itself functions as the print control apparatus of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-011395, filed Jan. 24, 2014 which is hereby incorporated by reference wherein in its entirety.

What is claimed is:

1. A print control apparatus for causing a printing apparatus to print on continuous paper each of a plurality of image portions obtained by dividing an image to be printed, the print control apparatus comprising:

a determination unit configured to determine a dividing line of the image to be printed such that a short-side direction of the image to be printed is divided by a length corresponding to a width direction of the continuous paper;

a display control unit configured to cause a display device to display the image to be printed so as to indicate the dividing line of the image to be printed determined by the determination unit;

an accepting unit configured to accept a command to scale or move the image to be printed in the display by the display control unit while the display control unit performs displaying; and a print control unit configured to cause the printing apparatus to print on the continuous paper the plurality of image portions obtained by dividing the image to be printed along the dividing line based on the dividing line determined by scaling or moving which is executed based on the command accepted by the accepting unit.

2. A print control apparatus according to claim 1, wherein the determination unit further determines the dividing line based on a predetermined margin forming a margin in the continuous paper.

3. A print control apparatus according to claim 1, wherein the determination unit determines the dividing line also based on a predetermined margin forming a margin in the continuous paper and a predetermined pasting width for a user to bond together a plurality of printed materials obtained by printing by the print control unit.

4. A print control apparatus according to claim 1, wherein the display control unit can switch between displaying and hiding of a position and a size of the margin for each of the plurality of image portions.

5. A print control apparatus according to claim 1, wherein the print control unit causes the printing apparatus to print the plurality of image portions such that the printing apparatus prints individual image portions on the continuous paper and cuts according to the size of the image portion, thereby to print the plurality of image portions.

6. A print control apparatus according to claim 1, wherein the display control unit causes the display device to display the plurality of image portions obtained by dividing the image to be printed along the dividing line determined by the determination unit.

7. A print control apparatus according to claim 6, wherein the display control unit causes the display device to display the plurality of image portions such that the plurality of image portions are arranged in a short-side direction of the image to be printed on a display screen of the display device.

8. A print control apparatus according to claim 1, further comprising:
    a memory configured to store one or more programs; and
    a processor configured to execute the one or more programs stored in the memory,
    wherein the processor functions as at least one of the determination unit, the display control unit, the accepting unit, and the print control unit, by executing a program of the one or more programs.

9. A print control apparatus according to claim 8, wherein the one or more programs includes an application.

10. A print control apparatus according to claim 8, wherein the one or more programs includes a printer driver.

11. A print control method for causing a printing apparatus to print on continuous paper each of a plurality of image portions obtained by dividing an image to be printed, the print control method comprising:
    a determination step of determining a dividing line of the image to be printed such that a short-side direction of the image to be printed is divided by a length corresponding to a width direction of the continuous paper;
    a display control step of causing a display device to display the image to be printed so as to indicate the dividing line of the image to be printed determined in the determination step;
    an accepting step of accepting a command to scale or move the image to be printed in the display in the display control step while displaying is performed in the display control step; and
    a print control step of causing the printing apparatus to print on the continuous paper the plurality of image portions obtained by dividing the image to be printed along the dividing line based on the dividing line determined by scaling or moving which is executed based on the command accepted in the accepting step.

12. A print control method according to claim 11, wherein in the determination step, the dividing line is further determined based on a predetermined margin forming a margin in the continuous paper.

13. A print control method according to claim 11, wherein in the determination step, the dividing line is determined also based on a predetermined margin forming a margin in the continuous paper and a predetermined pasting width for a user to bond together a plurality of printed materials obtained by printing in the print control step.

14. A print control method according to claim 11, wherein in the display control step, a position and a size of the margin for each of the plurality of image portions can be switched between displaying and hiding.

15. A print control method according to claim 11, wherein in the print control step, the printing apparatus is caused to print the plurality of image portions such that the printing apparatus prints individual image portions on the continuous paper and cuts according to the size of the image portion, thereby to print the plurality of image portions.

16. A print control method according to claim 11, wherein in the display control step, the display device is caused to display the plurality of image portions obtained by dividing the image to be printed along the dividing line determined in the determination step.

17. A print control method according to claim 16, wherein in the display control step, the display device is caused to display the plurality of image portions such that the plurality of image portions are arranged in a short-side direction of the image to be printed on a display screen of the display device.

18. A non-transitory computer-readable storage medium storing a program for causing a computer to perform a print control method for causing a printing apparatus to print on continuous paper each of a plurality of image portions obtained by dividing an image method comprising:
    a determination step of determining a dividing line of the image to be printed such that a short-side direction of the image to be printed is divided by a length corresponding to a width direction of the continuous paper;
    a display control step of causing a display device to display the image to be printed so as to indicate the dividing line of the image to be printed determined in the determination step;
    an accepting step of accepting a command to scale or move the image to be printed in the display in the display control step while displaying is performed in the display control step; and
    a print control step of causing the printing apparatus to print on the continuous paper the plurality of image portions obtained by dividing the image to be printed along the dividing line based on the dividing line determined by scaling or moving which is executed based on the command accepted in the accepting step.

19. A non-transitory computer-readable storage medium according to claim 18, wherein the program comprises an application.

20. A non-transitory computer-readable storage medium according to claim 18, wherein the program is a printer driver.

* * * * *